US005734975A

United States Patent [19]

Zele et al.

[11] Patent Number: 5,734,975

[45] Date of Patent: Mar. 31, 1998

[54] DIRECT-COUPLED SIGNALING RECEIVER WITH PL/DPL DETECTOR

[75] Inventors: Rajesh H. Zele, Plantation; Walter H. Kehler; Norman T. Rollins, both of Sunrise, all of Fla.

[73] Assignee: Motorola, Inc., Schaumburg, Ill.

[21] Appl. No.: 736,180

[22] Filed: Oct. 24, 1996

[51] Int. Cl.$^{6}$ .............................. H04B 1/10; H04B 1/26; H04B 1/16

[52] U.S. Cl. .......................... 455/307; 455/337; 455/338; 455/308; 327/554

[58] Field of Search .................................... 455/214, 312, 455/307, 337, 338, 339, 340, 308, 210, 212, 221, 222; 327/551, 552, 554

[56] References Cited

U.S. PATENT DOCUMENTS

| | | | |
|---|---|---|---|
| 4,600,904 | 7/1986 | Shumaker | 333/173 |
| 4,721,923 | 1/1988 | Bares et al. | 330/284 |
| 4,968,952 | 11/1990 | Kehler, Jr. | 331/11 |
| 4,991,227 | 2/1991 | Kehler, Jr. | 455/221 |
| 5,166,630 | 11/1992 | Lee | 328/167 |
| 5,303,405 | 4/1994 | Simmons et al. | 455/213 |
| 5,303,406 | 4/1994 | Hansen et al. | 455/222 |
| 5,454,118 | 9/1995 | Simmons et al. | 455/221 |
| 5,565,812 | 10/1996 | Soenen | 327/558 |

*Primary Examiner*—Tommy P. Chin
*Assistant Examiner*—David R. Vincent
*Attorney, Agent, or Firm*—Frank M. Scutch

[57] ABSTRACT

A detector circuit (100) for detecting signaling information transmitted with a radio frequency (RF) signal for interpretation by a radio receiver includes a first low pass filter (105) for filtering demodulated audio signals that are directly coupled thereto and for providing a first filtered signal. A second low pass filter (109) is directly coupled with the first low pass filter (105) for filtering the first filtered signal and providing a second filtered signal. A signaling detector (111) is then directly coupled with the second low pass filter (109) for determining the frequency and/or bit code of signaling information included in the second filtered signal.

26 Claims, 2 Drawing Sheets

DIRECT-COUPLED SIGNALING RECEIVER WITH PL/DPL DETECTOR

TECHNICAL FIELD

This invention relates in general to signal coupling and more particularly to signal coupling within an integrated circuit.

BACKGROUND

Portable radio receivers commonly include a privacy feature that allows the receiver's speaker to be in an unmuted state only when a specific subaudio frequency spectrum analog tone or digital code is detected. These features are commonly known as private line (PL) and digital private line (DPL). If the specific PL tone or DPL digital code expected is not received, the radio remains quiet or squelched.

As seen in prior art FIG. 1, detection of PL or DPL is accomplished by the following. The receiver demodulator is capacitively coupled to a signaling receiver. The signaling receiver typically amplifies the demodulator output, lowpass filters energy higher in frequency than the subaudio bandwidth, removes the direct current (DC) component, and then performs a one bit analog to digital conversion on the processed waveform. The latter two functions are commonly referred to as signaling detection. The output digital waveform is then further processed by a microprocessor.

Capacitively coupling the demodulated signal to the signaling receiver creates a number of problems. Capacitive coupling removes the demodulator signal DC component so that it is not amplified. If amplified, the DC component could cause clipping of the waveform in the signaling receiver which would degrade detection. However, capacitive coupling not only blocks DC, but also attenuates low frequency energy because the capacitor combined with the input impedance of the signaling detector forms a highpass filter. Because this highpass corner frequency must be kept sufficiently low to retain signal integrity, the coupling capacitor is typically too large to integrate. Not only does this increase part count for an integrated radio system, but this also means two integrated circuit pins must be dedicated to this capacitor, increasing integrated circuit (IC) pinouts. In addition, the time constant of the highpass filter formed by the coupling capacitor and input impedance is very large, so the recovery time from a step change in demodulator DC offset is very large.

After blocking the demodulator DC component, DC offsets will still be present at the input of the signaling detector due to nonideal behavior in the amplification and lowpass filtering blocks. These DC offsets are removed in the signaling detector by subtracting a lowpass filtered version of the signal from itself which constitutes another highpass filter configuration. This highpass corner frequency must also be sufficiently low so as to not harm signal integrity. The signaling detector has traditionally been either an analog design or a discrete-time design.

Problems with the analog design include the need for a large path gain, an internally generated DC offset, and a large silicon area for implementation. Problems with the discrete-time approach, which is usually comprised of a switched-capacitor offset-canceled comparator along with an integrated switched capacitor and an external large shunt capacitor, include a large path gain requirement and an internally generated DC offset caused by the integrated switched capacitor. In the past, these problems have been ignored because the signaling receiver path gain was made sufficiently large, and could be made large because of the demodulator coupling capacitor which removed the demodulator's DC offset. Typically, for the discrete-time design, the PL or DPL signal was amplified so as to be on the order of one-hundred times larger in amplitude than the offset caused by the signaling detector switched-capacitor lowpass filter.

These factors indicate a need for a PL/DPL detector circuit that eliminates capacitive coupling and the problems inherent in traditional signaling detectors to create an inexpensive circuit that can perform decoding of signaling information on a single integrated circuit.

DETAILED DESCRIPTION OF THE PREFERRED EMBODIMENT

Figure 1:
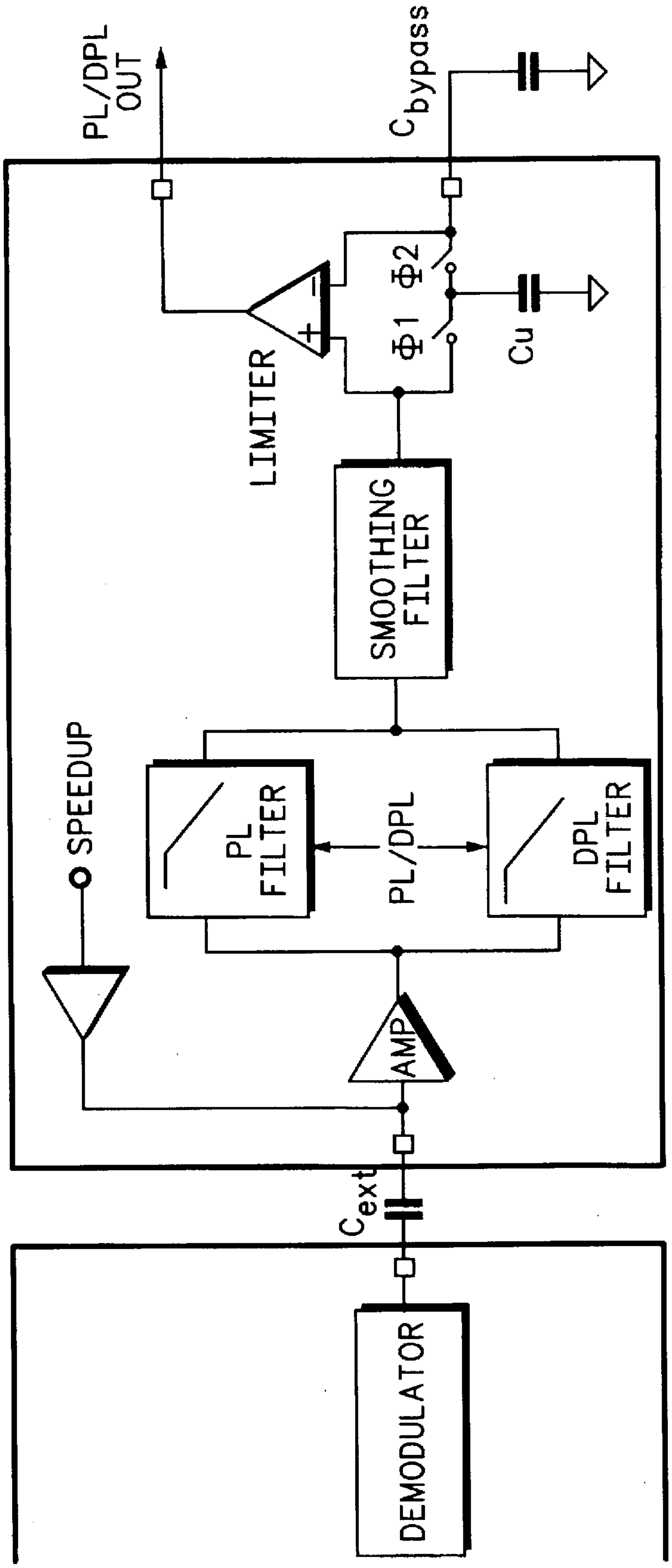
FIG.1 (PRIOR ART)
FIG. 1 is prior art showing a block diagram of an capacitively coupled PL/DPL circuit.
Figure 2:
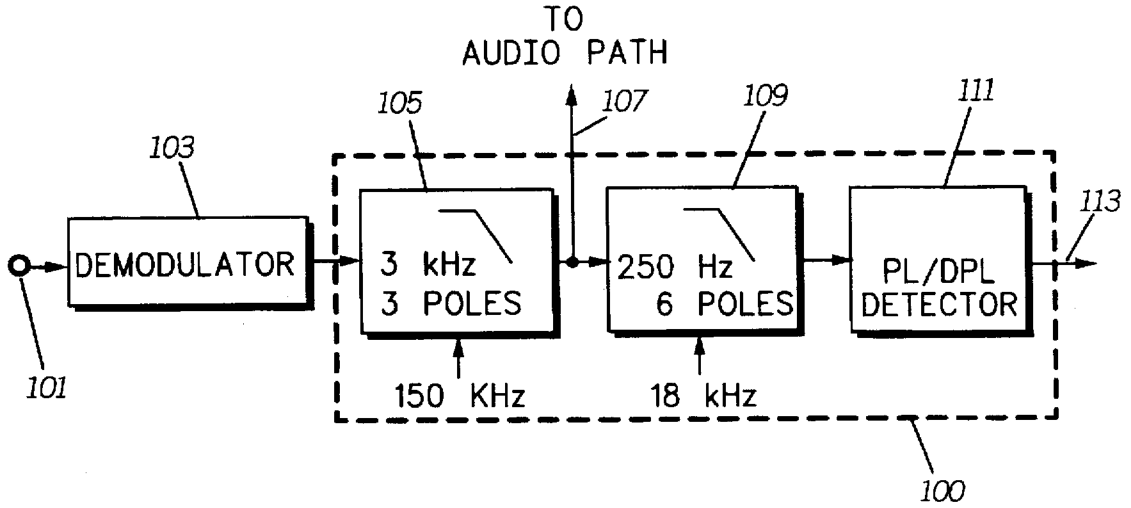
FIG. 2 is a block diagram of the direct coupled PL/DPL detector in a single chip IC according to the preferred embodiment of the invention.

Referring to FIG. 2, a block diagram of a direct current (DC) coupled private line (PL)/digital private line (DPL) detector circuit or signaling receiver 100 that includes an input port 101 used as an input for demodulated information from a radio frequency (RF) receiver. This demodulated information is typically PL or DPL information and may also include audio or other information. The PL or DPL signaling information allows the radio receiver to make a determination whether a user desires to further process the other information transmitted therewith.

For example, the radio can be preset to perform a predetermined function when a specific analog PL tone or digital code sequence (DPL) is received. Generally, the predetermined function will be for the radio receiver to unsquelch so that the audio information can be heard on a speaker or transducer. The use of PL or DPL allows multiple users to use one radio channel without allowing the radio receiver to be continuously unsquelched. Hence, when that user has no desire to hear unwanted audio or message traffic the radio receiver will remain quiet in a squelched state.

After reception by the radio receiver, the modulated information is input to a demodulator 103 which converts the received RF signal into audible and sub-audible information that can be used in the radio receiver. At this point, both audio and PL/DPL signaling information is output from the demodulator 103. It will recognized by those skilled in the art that for land mobile radios application the PL/DPL signaling bandwidth will be DC to 250 herz (Hz) and approximately 1/7 the demodulated voice amplitude.

Additionally, a DC signal component or DC offset will be present with the PL/DPL signaling information from the demodulator. This DC offset can be approximately 25 times larger than the PL/DPL signal amplitude due to internal offsets and frequency netting error. Since this undesired DC signal component or offset is much larger than the PL/DPL signal amplitude, it will not be eliminated when demodulator 103 is DC coupled to the signaling receiver 100.

The demodulated information including both audio and PL/DPL signal is input to a first low pass filter 105 that is directly coupled to the demodulator 103. As illustrated in FIG. 2, a 3 Kilohertz (KHz)—3 pole low pass filter is used at a clock frequency of 150 KHz for anti-alias protection. However, it will be recognized that differing cutoff frequencies and clock rates may be selected depending on the application and the desirability. The first low pass filter 105 allows only audio and signaling information below 3 KHz to be passed through the filter.

Additionally, the first low pass filter 105 is a switch-capacitor filter providing approximately 5 decibels (dB) of gain. As recognized by those skilled in art, a continuous time filter could be used. However the switched capacitor filter is better suited for this application as it occupies a small amount of die area and provides an accurate corner frequency. The first low pass filter 105 and the second low pass filter 109 (discussed hereinafter) will need to provide only a small amount of gain due to the direct coupling of each filter stage and the unique design of the detector.

At the output of the first low pass filter 105, the audio information can be output through appropriate processing stages to an audio amplifier and speaker (not shown) for interpretation by the user. The remaining PL/DPL information is subject to a second low pass filter 109. Here, the voice band information is removed since this filter has a cutoff frequency at approximately 250 Hertz (Hz) or less. As illustrated in FIG. 2, the second low pass filter 109 is a 250 Hz—6 pole filter using a clock frequency of approximately 18 KHz. Thus, only very low frequency PL/DPL signaling information, offset by some DC value, is permitted to pass through the filter where it can then be input to a PL/DPL detector 111.

The PL/DPL detector 111 removes the DC offset from the second low pass filter 109 output and then converts the signal into a digital form to be either output at an output port 113 to a microprocessor (not shown) or sent to an on-chip decoder (not shown). The PL/DPL detector 111 is discussed in further detail hereinafter with regard to FIG. 3.

Figure 3:
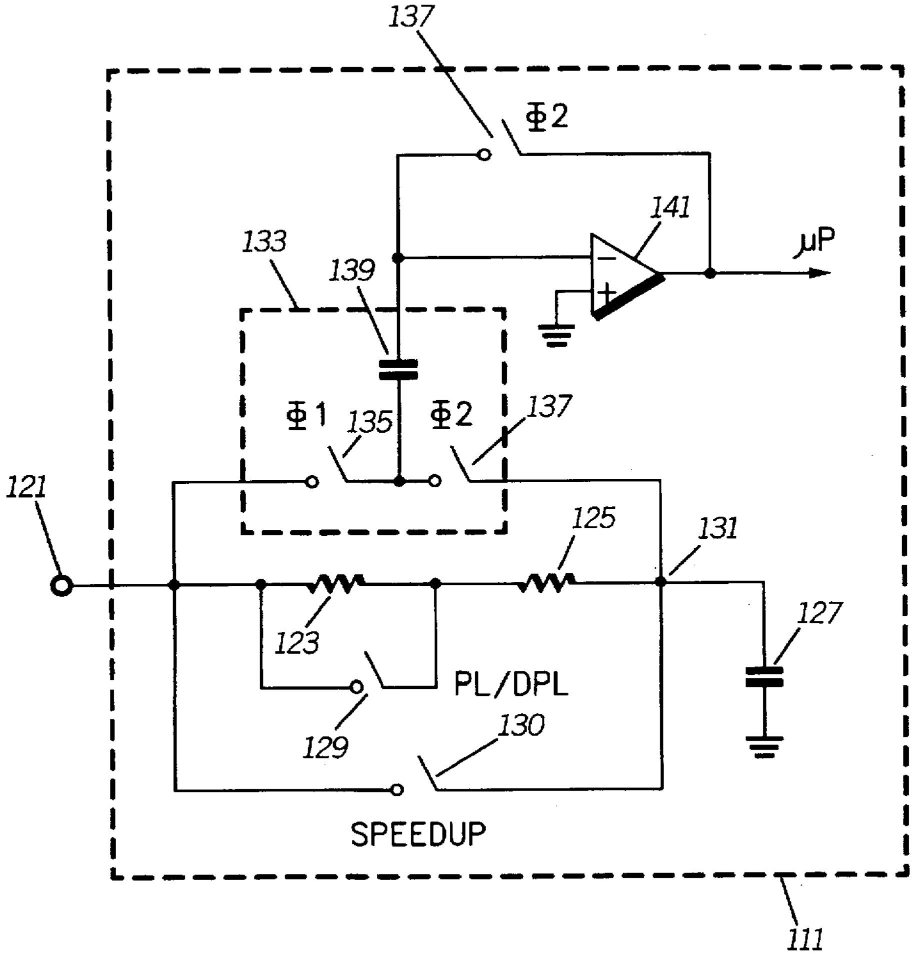
FIG. 3 is a schematic diagram of the detector circuit used in FIG. 2.

In FIG. 3, the detector 111, which utilizes a combination of discrete-time components such as switched capacitors and continuous time components such as analog resistors, removes the DC offset from the PL/DPL signaling information. The detector 111 includes an input node 121 that receives DC offset PL/DPL signaling information from the second low pass filter 109. The PL/DPL signaling information is first processed using a detector low pass (RC) filter comprised of resistor 123, resistor 125 and capacitor 127. Preferably the detector low pass filter has a selectable corner frequency so that settling time versus bandwidth trade-offs can be made. The selectable corner frequency will be different depending on whether PL or DPL signal is received.

The corner or cutoff frequency of the detector low pass filter can be selected or changed by altering the resistance of the detector low pass filter using a switch 129. Thus, resistor 123 is either bypassed or switched serially with resistor 125 depending on the type of signaling information received. Typically, the corner frequency for a PL signal will be approximately 17 Hz while for a DPL signal will have a corner frequency of approximately 0.6 Hz. As will be recognized by those skilled in the art, at such low corner frequencies, the DC component will be predominant at node 131. The AC component of the PL or DPL signal will be attenuated by the low pass filter. Additionally, a speedup switch 130 may be used to reduce setting time. Typically, this can be used during the initialization or the battery save modes and may be controlled manually or automatically by microprocessor.

In addition to passing through the detector low pass filter, the PL/DPL signaling information is input to a switched capacitor network 133. The switched capacitor network 133 includes a first non-overlapping clock 135 and a second non-overlapping clock 137 and a switching capacitor 139. Since both the PL/DPL signal and the DC component or offset of the PL/DPL signaling information is presented to the switched capacitor network 133, the switch capacitor network acts as a summer to subtract the DC component from the PL/DPL signal. The first non-overlapping clock in conjunction with capacitor 139 acts as a non-inverting input to a switched capacitor offset-canceled comparator 141 that is integrated with at least one real resistance. Preferably, the real resistance is serially segmented and tapped for providing a plurality of signaling time constants.

The second non-overlapping clock in conjunction with capacitor 139 acts as an inverting input to the comparator 141. Because the PL/DPL signal plus the DC offset is presented to comparator 141 during the non-inverting phase while only the DC offset from node 131 is presented to comparator 141 during the inverting phase, the net action at the detector input is to cancel the DC offset while passing only the desired PL/DPL signal. Thereafter, the remaining PL/DPL signal is input to the comparator 141 where it is processed into a digital bistable output signal with a substantially 50% duty cycle for a sinusoidal input. The output signal can then be used by a microprocessor (not shown) to determine whether the appropriate PL or DPL signaling information is being received.

Thus, the signaling receiver 100 is used to receive directly coupled PL/DPL signaling information and to remove any DC component from the signaling information. The detector 111, used in the signaling receiver, is a hybrid stage having both the discrete time components and the continuous time components providing a means of obtaining PL/DPL signaling information with a 50% duty cycle for a sinusoidal detector input.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A detector circuit for selecting signaling information transmitted with a radio frequency (RF) signal for interpretation by a radio receiver comprising:

at least one filter circuit for filtering demodulated audio signals direct current (DC) coupled thereto;

a signaling decoder DC coupled with the at least one filter circuit for determining a frequency and/or bit code of signaling information from the at least one filter circuit; and wherein the signaling decoder includes a first signaling path and a second signaling path where the first signaling path provides signaling information and direct current (DC) offset information to a switched capacitator subtracting circuit and the second signaling path provides only Dc offset information to the subtracting circuit.

2. A detector circuit as in claim 1 wherein the at least one filter circuit comprises a first active low pass filter and a second active low pass filter having a substantially low gain.

3. A detector circuit as in claim 2 wherein the first active low pass filter is a switched capacitor filter.

4. A detector circuit as in claim 3 wherein the second active low pass filter is a switched capacitor filter.

5. A detector circuit as in claim 1 further wherein the signaling decoder utilizes mixed analog and discrete-time components.

6. A detector circuit as in claim 1 wherein the signaling decoder is comprised of a switched capacitor offset-canceled comparator that is integrated with at least one real resistance.

7. A detector circuit as in claim 1 wherein at least one real resistance is serially segmented and tapped for providing a plurality of signaling time constants.

8. A detector circuit as in claim 1 wherein the signaling decoder is comprised of a switched capacitor offset-canceled comparator and a continuous time low pass filter.

9. A detector circuit as in claim 8 wherein the signaling decoder further includes at least one switch for altering the time constant of the continuous time low pass filter.

10. A detector circuit as in claim 1 wherein information from the first signal path and the second signal path are combined such that a portion of the signal information on the first signal path and the second signal path cancel for providing resultant signaling information to a comparator.

11. A signaling receiver for decoding analog and digital signaling information identifying a specific user among a plurality of users on a radio frequency (RF) channel comprising:

a first low pass switched capacitator filter direct current (DC) coupled to a demodulator for providing an audio signal and DC offset signaling information by a predetermined amount;

a second low pass switched capacitator filter DC coupled to the first low pass switched capacitator filter for filtering the audio signal and providing only the DC offset signaling information;

a detector DC coupled second low pass switched capacitor filter, the detector comprising a continuous time low pass filter and a discrete time comparator for providing a digital representation of the signaling information; and wherein the detector includes a first signaling path and second signaling path where the first signaling path provides signaling information and direct current (DC) offset information to a switched capacitator subtracting circuit and the second signaling path provides only DC offset information to the subtracting circuit.

12. A signaling receiver as in claim 11 wherein the first low pass switched capacitor filter is an active filter.

13. A signaling receiver as in claim 11 wherein the second low pass switched capacitor filter is an active filter.

14. A signaling receiver as in claim 11 further wherein the signaling receiver utilizes discrete-time and analog components.

15. A signaling receiver as in claim 11 wherein the discrete time comparator is a switched capacitor offset-canceled comparator that is integrated with at least one real resistance.

16. A signaling receiver as in claim 15 wherein the at least one real resistance is serially segmented and tapped for providing a plurality of signaling time constants.

17. A signaling receiver as in claim 11 wherein the detector further includes at least one switch for altering a time constant of the continuous time low pass filter.

18. A signaling receiver as in claim 11 wherein information from the first signal path and the second signal path are combined such that a portion of the signaling information on the first signal path and the second signal path is canceled providing a resultant signaling information to a comparator.

19. A method for providing a digital representation of signaling information received in a radio receiver comprising the steps of:

receiving a demodulated signal including an audio signal, direct current (DC) offset signaling information and extraneous information from a demodulator located within the radio receiver;

DC coupling the demodulated signal from the demodulator to a first filter;

filtering the demodulated signal in the first filter such that the extraneous information is eliminated and the audio signal and DC offset signaling information is amplified;

DC coupling the audio signal and DC offset signaling information directly to a second filter;

filtering the audio signal and DC offset signaling information in the second filter such that the audio signal is eliminated;

DC coupling the DC offset signaling information directly to a detector having a first signaling path and second signaling path where the first signaling path provides signaling information and direct current (DC) offset information to a switched capacitor subtracting circuit and the second signaling path provides only DC offset information to the switched capacitor subtracting circuit;

detecting the DC offset signaling information such that DC offset of the signaling information is cancelled providing a resultant signaling information; and converting the resultant signaling information into a digital format for interpretation by the radio receiver.

20. A method for providing a digital representation of signaling information as in claim 19 wherein the first filter is a switched capacitor filter.

21. A method for providing a digital representation of signaling information as in claim 20 wherein the second filter is a switched capacitor filter.

22. A method for providing a digital representation of signaling information as in claim 19 wherein the detecting step includes a mixed analog and discrete time circuit.

23. A method for providing a digital representation of signaling information as in claim 19 wherein the detecting step utilizes a switched capacitor offset-canceled comparator that is integrated with at least one real resistance.

24. A method for providing a digital representation of signaling information as in claim 23 wherein the at least one real resistance is serially segmented and tapped for providing a plurality of signaling time constants.

25. A method for providing a digital representation of signaling information as in claim 19 further comprising the step of:

altering a time constant of the detector using at least one switch for changing at least one real resistance.

26. A method for providing a digital representation of signaling information as in claim 25 wherein the at least one real resistance is serially segmented and tapped for providing a plurality of signaling time constants.

* * * * *